I. TRAUTMAN.
AUTOMOBILE TIRE.
APPLICATION FILED JAN. 6, 1920.

1,381,602. Patented June 14, 1921.

Inventor
IRA TRAUTMAN
By his Attorney
O. Ellery Edwards

UNITED STATES PATENT OFFICE.

IRA TRAUTMAN, OF NEW YORK, N. Y.

AUTOMOBILE-TIRE.

1,381,602.     Specification of Letters Patent.     Patented June 14, 1921.

Application filed January 6, 1920. Serial No. 349,678.

*To all whom it may concern:*

Be it known that I, IRA TRAUTMAN, a citizen of the United States, and a resident of the city of New York, county of Kings, and State of New York, have invented a new and useful Improvement in Automobile-Tires, of which the following is a specification.

The object of my invention is to provide a tire which will take the place of a pneumatic tire and be as easy riding as a pneumatic tire and yet be free from the disadvantages of such tires, namely, liability to punctures and blow-outs and the requirement of careful watching so as to see that they are at all times properly inflated. This object is accomplished by my invention in which a number of radially disposed cushions are interposed and are connected by an annular steel reinforcing ring at their outer ends, which ring is covered by a rubber tread in the conventional manner.

For a more particular description of my invention, reference is to be had to the accompanying drawings, forming a part hereof, in which—

Throughout the various views of the drawings, similar reference characters designate similar parts.

Figure 1:
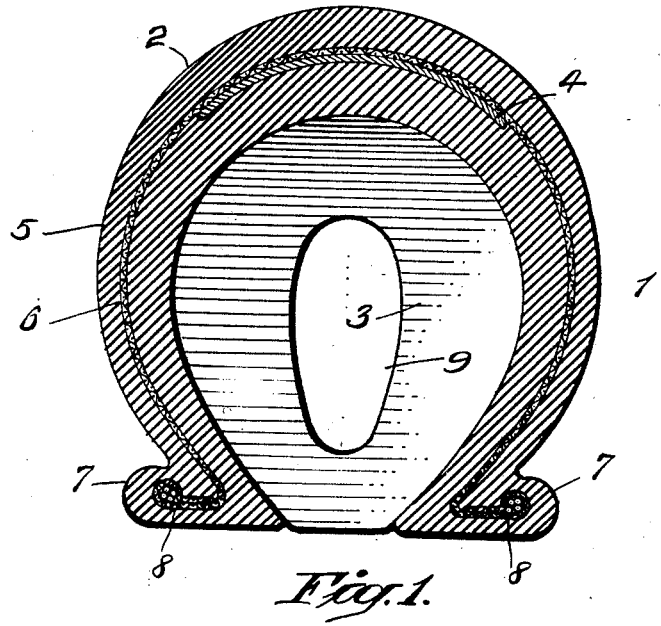
Figure 1 is a cross section of my improved tire.
Figure 2:
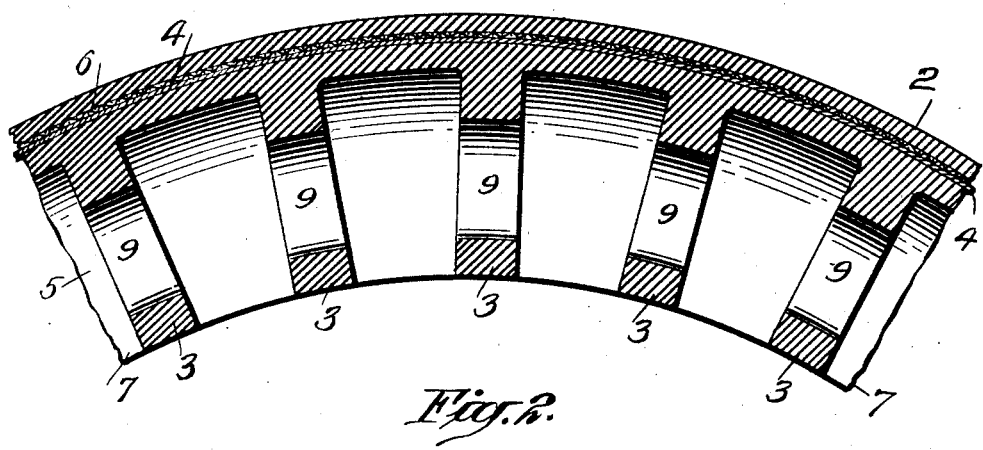
Fig. 2 is a longitudinal section of a portion of the same.

My improved tire 1 is provided with a tread 2 which is supported by radially disposed cushions 3 by means of a metallic reinforce 4. The tire 1 appears like an ordinary pneumatic tire and its tread 2 is a part of what might be termed a shoe 5, which has an ordinary canvas reinforce 6 which extends to the heels 7 and is preferably reinforced at each heel by a wire cable 8. The canvas 6 extends over the annular steel rim 4 which is preferably bent so that its cross section is an arc of a circle for substantially ninety degrees. This ring 4 is endless and homogeneous throughout.

The cushions 3 are provided with a central, oblong opening 9 which is shaped according to the size of the tire and the weight it is expected to carry, this opening being smaller in large tires in proportion to the total cross section of the tire than in small tires which carry only a light load. This is because the resiliency of the tire will, to some extent, depend on the size of these openings.

In the preferred embodiment of my invention, the cushions 3 are put in the shoe 5 and in a partially vulcanized condition so that all parts may be uniformly vulcanized in the vulcanizing apparatus. As the tire is open between the cushions, it is easy to vulcanize the tire so that it will be properly cured throughout.

In use the tire appears exactly like an ordinary pneumatic tire except that all valves are absent and its resiliency is substantially the same as a pneumatic tire so that when it is in use no one would know the difference either from its appearance or riding qualities. It has a great advantage in that it will not puncture, blow-out or require any inflation or other attention after it is once placed in position until it is worn out.

While I have shown and described one embodiment of my invention, it is obvious that it is not restricted thereto, but is broad enough to cover all structures that come within the scope of the annexed claims.

Having thus described my invention, what I claim is:

1. An automobile tire comprising a shoe with heels, a tread, canvas reinforcing the tread, a metal ring curved in cross section reinforcing said canvas and tread and radially disposed and perforated cushions integral with the shoe and supporting the tread and ring, whereby the shoe is resilient and supported at all times without the use of a pneumatic tube.

2. An automobile tire comprising a shoe with heels, a tread, canvas reinforcing the tread, a metal ring reinforcing the tread and radially disposed cushions integral with the shoe and supporting the tread and ring, whereby the shoe is resilient and supported at all times without the use of a pneumatic tube.

IRA TRAUTMAN.